United States Patent
Kieweler et al.

(10) Patent No.: US 12,468,282 B2
(45) Date of Patent: Nov. 11, 2025

(54) METHOD AND SYSTEM FOR DETERMINING THE DYNAMIC RESPONSE OF A MACHINE

(71) Applicant: TRUMPF Werkzeugmaschinen SE + Co. KG, Ditzingen (DE)

(72) Inventors: Thomas Kieweler, Wimsheim (DE); Martin Lukas, Gerlingen (DE); Martin Schober, Gerlingen (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 816 days.

(21) Appl. No.: 17/840,639

(22) Filed: Jun. 15, 2022

(65) Prior Publication Data

US 2022/0308551 A1    Sep. 29, 2022

Related U.S. Application Data

(63) Continuation of application No. PCT/EP2020/087177, filed on Dec. 18, 2020.

(30) Foreign Application Priority Data

Dec. 20, 2019 (DE) ................ 10 2019 135 488.9

(51) Int. Cl.
*G05B 19/40* (2006.01)
*G05B 19/406* (2006.01)
*G06F 30/23* (2020.01)

(52) U.S. Cl.
CPC .. *G05B 19/406* (2013.01); *G05B 2219/37214* (2013.01); *G06F 30/23* (2020.01)

(58) Field of Classification Search
None
See application file for complete search history.

(56) References Cited

U.S. PATENT DOCUMENTS

| | | | | |
|---|---|---|---|---|
| 4,976,177 A | * | 12/1990 | Fouche | B23Q 11/0032 310/90.5 |
| 6,198,246 B1 | * | 3/2001 | Yutkowitz | G05B 11/42 318/610 |

(Continued)

FOREIGN PATENT DOCUMENTS

| | | | | |
|---|---|---|---|---|
| BE | 1009459 A3 | * | 4/1997 | ............. G06F 30/23 |
| CA | 2833416 A1 | * | 5/2014 | ......... G01R 19/2513 |

(Continued)

OTHER PUBLICATIONS

Abdulshahed et al., "Thermal error modelling of a gantry-type 5-axis machine tool using a Grey Neural Network Model", Feb. 2016, Journal of Manufacturing Systems 41 (2016) 130-142. (Year: 2016).*

(Continued)

*Primary Examiner* — Mohammad Ali
*Assistant Examiner* — Kelvin Booker
(74) *Attorney, Agent, or Firm* — LEYDIG, VOIT & MAYER, LTD.

(57) ABSTRACT

A method for determining a dynamic response of a machine having at least one axis, including performing a measurement run for each axis of the machine over an entire work area of each respective axis, capturing and recording data associated with each measurement run, determining a time-frequency representation of recorded data using a data processing unit, and analyzing the time-frequency representation or a related representation using an image processing algorithm.

14 Claims, 1 Drawing Sheet

(56) References Cited

U.S. PATENT DOCUMENTS

| | | | |
|---|---|---|---|
| 2004/0144177 A1 | 7/2004 | Flock et al. | |
| 2011/0173496 A1* | 7/2011 | Hosek | G07C 3/00 |
| | | | 714/26 |
| 2014/0201571 A1* | 7/2014 | Hosek | B25J 9/1674 |
| | | | 714/26 |
| 2016/0300341 A1 | 10/2016 | Hay et al. | |
| 2017/0219420 A1* | 8/2017 | Takahashi | G01M 7/025 |
| 2018/0018778 A1 | 1/2018 | Haverkamp et al. | |
| 2018/0088007 A1 | 3/2018 | Oho et al. | |
| 2018/0275639 A1 | 9/2018 | Shinoda et al. | |
| 2019/0009407 A1 | 1/2019 | Iwanami | |
| 2019/0035047 A1 | 1/2019 | Lim et al. | |
| 2019/0041825 A1* | 2/2019 | Rost | G05B 19/27 |
| 2019/0310605 A1 | 10/2019 | Jalluri et al. | |
| 2020/0103854 A1* | 4/2020 | Hashimoto | B23F 9/10 |
| 2020/0103855 A1* | 4/2020 | Hashimoto | G05B 19/182 |
| 2020/0160152 A1 | 5/2020 | Büttner et al. | |
| 2021/0299808 A1* | 9/2021 | Van Sprang | B23Q 17/003 |
| 2021/0379718 A1* | 12/2021 | Van Sprang | B23Q 17/0966 |
| 2022/0308557 A1* | 9/2022 | Kiefer | G05B 19/4155 |
| 2022/0317664 A1* | 10/2022 | Bauer | G05B 19/406 |

FOREIGN PATENT DOCUMENTS

| | | | | |
|---|---|---|---|---|
| CN | 102825504 A | | 12/2012 | |
| CN | 107430772 A | | 12/2017 | |
| CN | 108629864 A | * | 10/2018 | B23Q 17/00 |
| CN | 113290261 A | * | 8/2021 | B23Q 1/70 |
| CN | 215657877 U | * | 1/2022 | B23Q 1/70 |
| DE | 202005013090 U1 | | 1/2007 | |
| DE | 102009020246 A1 | | 11/2010 | |
| DE | 102017122315 A1 | | 3/2018 | |
| DE | 102018002303 A1 | | 9/2018 | |
| DE | 102018005199 A1 | | 1/2019 | |
| EP | 2500708 A1 | | 9/2012 | |
| EP | 2690513 A1 | | 1/2014 | |
| EP | 3168700 A1 | | 5/2017 | |
| EP | 3396485 A1 | | 10/2018 | |
| EP | 3425460 A1 | | 1/2019 | |
| JP | 2016140576 A | | 8/2016 | |
| JP | 7456074 B1 | * | 3/2024 | |
| KR | 20170017561 A | * | 2/2017 | G05B 19/404 |
| WO | WO 03027627 A1 | | 4/2003 | |
| WO | WO 2017093126 A1 | | 6/2017 | |

OTHER PUBLICATIONS

Kalkat et al., "Rotor Dynamics Analysis of Rotating Machine Systems Using Artificial Neural Networks", Jun. 2002, International Journal of Rotating Machinery, 9: 255-262, 2003. (Year: 2002).*

Blasera et al., "Adaptive learning control for thermal error compensation of 5-axis machine tools", Nov. 2016, Journal of Manufacturing Systems 44 (2017) 302-309. (Year: 2016).*

Brezina et al., "Improvement of Heavy Machine Tool Dynamics By Passive Dynamic Vibration Absorber", Dec. 2015, MM Science Journal, Dec. 2015. (Year: 2015).*

Peng et al, "Study on the spindle axial thermal error of a five-axis machining center considering the thermal bending effect", Feb. 2022, Precision Engineering 75 (2022) 210-226. (Year: 2022).*

Yang et al., "Dynamic neural network modeling for nonlinear, nonstationary machine tool thermally induced error", Jul. 2004, International Journal of Machine Tools & Manufacture 45 (2005) 455-465. (Year: 2004).*

Zhou et al., "Efficient characterization of dynamic response variation using multi-fidelity data fusion through composite neural network", May 2020, Engineering Structures 232 (2021) 111878. (Year: 2020).*

Lin et al., "Robust Fuzzy Neural Network Sliding-Mode Control for Two-Axis Motion Control System", Apr. 2004, IEEE Transactions on Industrial Electronics, vol. 53, No. 4, Aug. 2006. (Year: 2004).*

Lu et al., "Fault Diagnosis for Rotating Machinery: A Method based on Image Processing", Jun. 2016, PLoS One journal. (Year: 2016).*

Hizarci et al., "Vibration Region Analysis for Condition Monitoring of Gearboxes Using Image Processing and Neural Networks", Apr. 2018, Experimental Techniques (2019) 43:739-755. (Year: 2018).*

Lu et al., "Tacholess Speed Estimation in Order Tracking: A Review With Application to Rotating Machine Fault Diagnosis", Nov. 2018, IEEE Transactions on Instrumentation and Measurement, vol. 68, No. 7, Jul. 2019. (Year: 2018).*

Al-Badour et al., "Vibration analysis of rotating machinery using time-frequency analysis and wavelet techniques", Aug. 2008, Mechanical Systems and Signal Processing 25 (2011) 2083-2101. (Year: 2008).*

* cited by examiner

METHOD AND SYSTEM FOR DETERMINING THE DYNAMIC RESPONSE OF A MACHINE

CROSS REFERENCE TO RELATED APPLICATIONS

This application is a continuation of International Application No. PCT/EP2020/087177 (WO 2021/123276 A1), filed on Dec. 18, 2020, and claims benefit to German Patent Application No. DE 10 2019 135 488.9, filed on Dec. 20, 2019. The aforementioned applications are hereby incorporated by reference herein.

FIELD

The invention relates to a method for determining the dynamic response of a machine having multiple axes. Moreover, the invention relates to a corresponding system.

BACKGROUND

The measurements used to assess the dynamic properties of machines, in particular machine tools, in particular complex frequency measurements, have been performed for each axis individually to date on the basis of position or pose. A statement about dependencies of the dynamic properties of an axis on the individual axis position and on the position of other axes and about the identification of complex cause-and-effect relationships is possible only to a very limited extent.

In particular, only measurements of the dynamic properties at a few selected positions in the workspace are performed in the prior art. This greatly limits the validity of statements about location dependencies. If location dependencies relating to other axes are to be examined, this is possible only by preconfiguring a few starting positions. Even this allows only location-discrete statements.

SUMMARY

In an embodiment, the present disclosure provides a method for determining a dynamic response of a machine having at least one axis, comprising performing a measurement run for each axis of the machine over an entire work area of each respective axis, capturing and recording data associated with each measurement run, determining a time-frequency representation of recorded data using a data processing unit, and analyzing the time-frequency representation or a related representation using an image processing algorithm.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
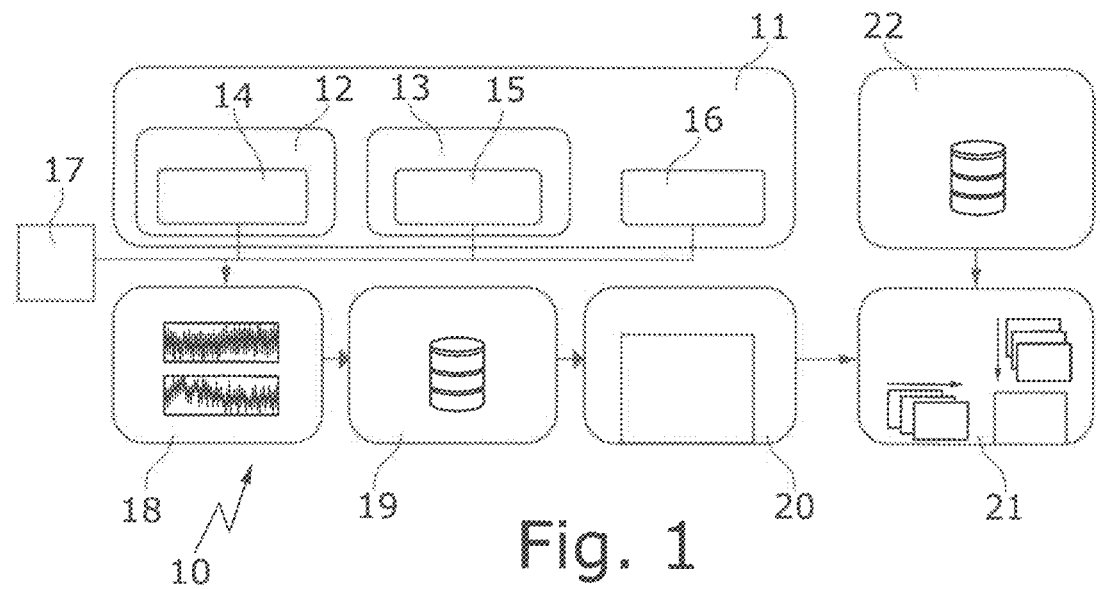
FIG. 1 shows an embodiment of the system according to the invention for determining the dynamic response of a machine.

In an embodiment, the present invention determines the dynamic response of a machine having multiple axes over the entire workspace.

In an embodiment of the invention, a method for determining the dynamic response of a machine having at least one axis, comprises the method steps of:
a. performing a measurement run for each axis over the entire work area thereof;
b. capturing and recording data associated with the measurement run;
c. using a data processing unit to determine a time-frequency representation of recorded data;
d. analyzing the time-frequency representation or a related representation, in particular in the image area, by means of an image processing algorithm.

Machine tools involve machining units, such as tool holders, which hold a tool, or laser machining heads, being moved in a specific axial direction by way of drives and possibly interposed mechanical components, such as gears or portals, on which the machining unit may be mounted. This is often referred to in abbreviated form as an "axis". An axial position is therefore the position of the machining unit in the axial direction, which is brought about by the relevant axis. The work area of an axis is the area in which the machining unit may be moved by the respective axis. The workspace is produced as a result of the work areas of the axes of a machine tool being overlaid. The workspace is therefore the spatial area that may be reached by the machining unit. A pose or spatial attitude is the combination of position and orientation of an object, e.g. a machining unit.

In an embodiment, the method according to the invention is used to execute measurement runs preferably in such a way that the entire workspace is covered. Measurement runs for each axis are performed over the entire work area of the axis to be examined. In particular, multiple measurement runs may be performed for each axis.

Data from different data sources may be captured and recorded during a measurement run. By way of example, there may be provision for sensors as data sources on a machine that perform measurements. Controllers and drives of the machine may also be data sources, the input and/or output signals of which may be captured as data.

The data captured and recorded during a measurement run may either be recorded in time sync or synchronized later. The duration of the recording may be dependent on the axial length of the axis that is to be considered. A short sampling time that is suitable in light of the system response to be observed (sampling theorem) is preferably chosen for the data capture. In an embodiment, the method according to the invention allows a comprehensive statement about location dependencies of the dynamic properties of a machine with time-(spatial) frequency resolution that is restricted only by the feed rate used for measurement and the sampling frequency of the data capture. In particular, statements about the dynamic properties of an axis may be made on the basis of the individual axis position and the position of other axes. As such, global statements about the complete location dependencies are possible. Cause-and-effect relationships may be identified in an automated manner.

A measurement run for an axis may be carried out in sections. In particular, different sections may be measured at different times. However, the entire axis, i.e. the entire work area of the axis, is intended to be measured in total.

The measurement run may be performed during downtimes or while the machine is operating. Downtimes are times in which no workpiece machining is performed by the machine. However, it is also conceivable for at least sections of a work area of an axis to be measured in parallel with production, for example during positioning between contours, i.e. when the machining unit is moved from one machining spot to another machining spot. Data recordings while the installation is operating are also possible as online measurements, however.

Alternatively, the measurement runs may be performed in a separate measurement program. The measurement program may be performed before a machine is actually started up or during down times of the machine, for example.

The time-frequency representation of the recorded data may be taken as a basis for determining the system response, in particular by way of the data processing unit. The time-indexed measurements may be used to determine spectra of excitation and output signals. The ratio of these spectra yields a representation of the dynamic response of the system in the frequency domain.

The time-frequency representation may in particular be analyzed in an automated manner.

The measurement run may be performed using a predefined input signal, in particular of a drive, the input signal comprising a predefined signal overlaid with an excitation signal. By way of example, the predefined signal that is predefined may be a constant speed at which an excitation signal is overlaid. An excitation signal may be a technical approximation of white noise, for example. A specific suitable speed profile may be predefined depending on the type of measurement run or measurement to be performed. For the types of measurements (for example reference frequency response of position control loop, reference frequency response of rotational-speed/speed control loop, noise frequency response of rotational-speed/speed control loop, rotational-speed/speed controller section, mechanical frequency response) used for assessing dynamic properties (diagnosis of mechanical properties or the interaction of control settings and mechanical properties), a constant speed overlaid with a suitable excitation signal may be chosen as the input signal.

The components (for example drive, gear racks, measuring systems) involved in the movement that are present in the drivetrain of each axis may undergo diagnosis by zeroing the overlaid excitation signal. Multiple single measurement runs may be selected with different feed rates, i.e. speeds, or with other suitable speed profiles (for example a linear increase in the speed over the axial position).

A multistage approach is conceivable for examining dependencies on the workspace position. To take account of the dependencies of the dynamic properties on the workspace position of axes other than the axis to be examined, said axes may be pre-positioned at specific positions and the measurement/measurement run may be performed for each pose. An axis other than the axis to be examined may thus be pre-positioned in different positions and a measurement run for the axis to be examined may be performed for each position of the other axis.

A measurement run may be performed for at least one axis while another axis is being moved. In particular, the simultaneous movement of multiple axes in conjunction with the recording of data for the axis to be examined is possible. In particular, when multiple axes are moved simultaneously, the reciprocal influencing thereof may be examined by appropriately overlaying the excitation signals and recordings of the input and output signals, and therefore a depiction of all of the moved (mechanical) components of the whole system (machine (tool)) may also be produced. Multiple forms are conceivable for the depiction. The characterization may be carried out in the frequency domain as a frequency response. Furthermore, system identification methods in the time domain, e.g. NARMAX (Nonlinear AutoRegressive Moving Average with eXogenous input), subspace system identification etc., may be used. In particular, a coupling matrix may be produced for linear time-invariant systems.

According to an embodiment of the invention, when a single axis is being measured, there is provision for the input and output signals to be recorded as data over the entire work area of the axis. The output signal measured may be for example current (in particular current drawn by the drive of the axis), feed rate, rotational speed (of the drive or, if there is a gear, of the output), acceleration, etc. For examining the coupling of multiple axes, the number of data items to be recorded increases according to the response characteristic to be examined.

The data may be captured for example by way of a data capture unit that is capable of recording the data in time sync over the entire period of the measurement, in particular a measurement run. The data capture unit may be part of a controller (of the machine) and may interact with a storage unit. Alternatively, the data capture unit may be an external component, such as for example an IPC (industrial PC), or a realtime-capable data capture unit having at least one physical communication interface and in particular having a data storage functionality, that is connected to the data sources, with the result that recording of the data and appropriate storage are possible.

The time-frequency representation may be determined for example by means of a transformation, in particular Fourier transformation, quadratic transformation or Wigner-Ville distribution. By way of example, a short-time Fourier transformation may be performed. The time reference for at least one axis may be converted into a location reference. The representation may be analyzed, or rated, in the image area by means of image processing algorithms. This may be carried out for example on the basis of stipulated indicators, for example on the basis of statistical values for single features such as threshold values with/without a location reference. Furthermore, the analysis may be carried out on the basis of the representation itself as a high-correlation tensor that is processed further in the data processing unit. By way of example, the data of the Bode plot may be provided in two matrices that involve the amplitude information, in one matrix, and the phase information, in another matrix, being separately converted into a normalized gray-scale value on the basis of location. It is thus possible to examine the data using image processing algorithms and to train neural networks in order to replace previous series-dependent examination methods, having only local validity, with comprehensive methods. This leads to a significantly simplified diagnostic process.

Further parameters such as life of and wear on components and also service interventions can be taken into consideration when analyzing the data. This analysis may take place for a population or for the time characteristic of the same or similar machines per feature, which also allows relevant features to be identified in an automated manner. The population may be the set of systems (=machine (tool)) having nominal identical characteristics (=motor, gear, machine body, etc.). The "features" extracted from measurements may be e.g. natural frequencies, attenuations, hystereses, etc. These features have a statistical distribution. The characteristics of these distributions (e.g. mean values, standard deviations) may for their part be relevant for characterizing a population.

If e.g. the standard deviation of a natural frequency is greater for machines from production line A than from production line B, this suggests differences in the (nominally identical) production process.

The image processing algorithms may comprise machine learning. In particular, the algorithms may set up a statistical model that is based on training data, i.e. the captured data. In particular, patterns and principles may be identified in the captured data. As such, unknown data may also be assessed following completion of the learning process. A possible applied learning variant using artificial neural networks is so-called deep learning, which may be applied according to embodiments of the invention. This may include for example, convolutional neural networks, deep auto encoders, generative adversarial networks.

In particular, there may be provision for an artificial neural network to be trained by feeding the analysis of the representation in the image area to the neural network.

The neural network may be provided with metadata. In particular, information from other data sources, for example data labeling on the basis of service intervention histories (for example information about actions performed or components replaced) may be fed to the neural network. These metadata may be taken into consideration during the analysis for the purpose of automatically classifying measurement data. Automated identification of complex cause-and-effect relationships is therefore possible.

At least some of the method steps may be performed on physically distributed systems. By way of example, the image processing algorithm may be executed on the machine, on a realtime-capable data capture unit having at least one physical communication interface and in particular having a data storage functionality, on a computer or in a cloud structure.

In some embodiments, the invention additionally covers a system for determining the dynamic response of a machine having multiple axes, having a machine, in particular machine tool, that comprises multiple axes, at least one data source connected to a data capture unit, a data storage unit for storing the captured data and a data processing unit that is configured to determine a time-frequency representation of the recorded data, and also an image processing device for processing the time-frequency representation. The data sources may be machine-internal data sources or machine-external data sources. Machine-internal data sources are able to supply current, acceleration, speed, actual-position and/or setpoint values, for example. Furthermore, machine-internal data sources may come from controllers, for example from a programmable logic controller (PLC) or a numerical controller (NC). Moreover, the drives of the axes may be data sources. Furthermore, data sources are able to supply laser power, gas pressure, scattered light, etc., as data.

Machine-external data sources may be for example microphones, micro-electromechanical systems (MEMS) sensors, or cameras. The data capture unit may be part of a controller. Alternatively, the data capture unit may be an external component for data capture, for example a realtime-capable data capture unit having at least one physical communication interface and in particular having a data storage functionality, or an IPC.

The image processing device may be in the form of a neural network or may comprise such. Such an image processing device allows self-learning image processing algorithms to be used, in particular machine learning and so-called deep learning. Furthermore, it is possible to classify the data on the basis of additional information, for example on the basis of service intervention reports, spares replacement, etc. It is therefore possible to make a comprehensive statement about location dependencies of the dynamic properties of a machine tool with time-(spatial) frequency resolution that is restricted only by the feed rate used for measurement and the sampling frequency for the data capture. Local divergences in the examined system are able to be detected. Furthermore, a global statement about location dependencies may be made in much shorter time than previously. Complex cause-and-effect relationships may be identified in an automated manner.

Further features and advantages of the invention will emerge from the detailed description of an exemplary embodiment of the invention that follows, with reference to the figures of the drawing, which shows details essential to the invention, and from the claims. The features shown here are to be understood as not necessarily to scale and are illustrated in such a way that the characteristic features according to the invention can be made distinctly visible. The various features may be realized in each case individually by themselves or as multiples in any desired combinations for variants of the invention.

The schematic drawing illustrates an exemplary embodiment of the invention that is explained in the description that follows.

FIG. 1 shows a system 10 for determining the dynamic response of a machine 11 that has multiple axes 12, 13. The machine 11 furthermore comprises data sources 14, 15, 16, the data sources 14, 15 being associated with the axes 12, 13. This may be in particular an internal sensor system. Furthermore, the data sources 14, 15 may be controllers. The data that may be output are current or rotational speed, for example. The machine 11 may comprise further data sources 16, which are in the form of sensors, for example. By way of example, this allows an acceleration of a machining unit to be measured. There may additionally be provision for external data sources 17. The data source 17 may be in the form of a microphone or camera, for example. The use of additional data sources, for example acceleration sensors, rotation rate sensors, microphones, cameras, etc., allows characterizing system properties to be ascertained.

The data captured from the data sources 14, 15, 16, 17 are fed to a data capture unit 18. The data coming from the data sources 14, 15, 16, 17 may be recorded in time sync; in particular, the data sources 14-17 may be synchronized. Alternatively, the data may be synchronized subsequently, for example in the data capture unit 18. In particular, the data capture unit 18 may be configured to record the data in time sync over the entire period of the measurement. The data capture unit 18 may be part of a controller. In the exemplary embodiment shown, it is in the form of an external realtime-capable data capture unit having at least one physical communication interface and in particular having a data storage functionality.

During the data capture, an axis 12, 13 or machine 11 is moved over its entire work area. A possible input signal is a constant speed for a single axis of the system (predefined constant speed for the movement of a machining unit by the axis) that is overlaid with an excitation signal. The output signal, that is to say the data supplied by the data sources 14-17, may correspond to the current, the feed rate, the rotational speed or the acceleration, for example.

For examining the coupling of multiple axes 12, 13, the number of data items to be recorded increases. The recorded data are stored in a data storage unit 19. Following this, data processing or data preprocessing is carried out in a data processing unit 20. In particular a time-frequency representation of the recorded data is ascertained here. Alternatively or additionally, the system response of the machine 11 may be determined, for example as a transfer function on the assumption of a linear time-invariant system or as a representation using the NARMAX approach. Optionally, the time-frequency representation may subsequently be converted into a location-frequency representation.

The data are subsequently analyzed in an image processing device 21. In particular, the representation that results from the time-frequency transformation may be rated in the image area on the basis of stipulated indicators. For example, statistical values may be determined for single features, such as threshold values with and without a location reference. The representation itself may be processed further as a high-correlation tensor. One approach is for example representation of the information of the Bode plot in two matrices that are used to separately convert the amplitude information, in one matrix, and the phase information, in another matrix, into a normalized grayscale value on the basis of location. It is thus possible to examine the data using modern image processing algorithms, in particular using machine learning, and to train suitable neural networks in order to replace previous series-dependent examination methods, having only local validity, with comprehensive methods. This leads to a significantly simplified diagnostic process, including ascertainment of the properties relevant for the examination.

The image processing device 21 may be fed so-called metadata by a further memory 22. It is therefore possible for further parameters to be taken into consideration for the data analysis. Further parameters are for example the life of a machine, wear, service interventions, etc.

Figure 2:
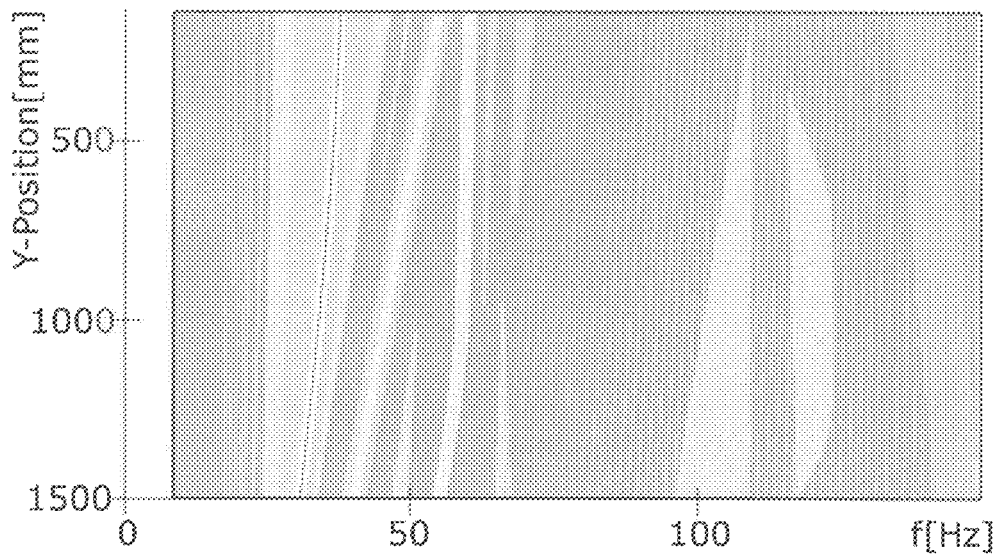
FIG. 2 shows a location-frequency representation of data.

FIG. 2 shows a location-frequency graph. This was determined by measuring the frequency response of the x-axis of a machine while the y-axis moved. The colors or grayscales show the amplitude of the frequency response. This representation can be taken as a basis for determining the frequency response of the x-axis at any time and at any spot. Therefore, not only are point-by-point data available as previously, but it is also possible for a frequency response to be determined generally in the entire work area of the x-axis.

Figure 3:
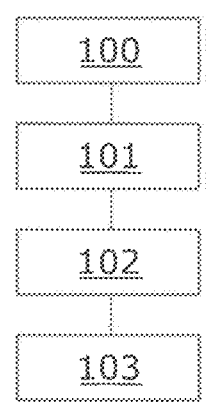
FIG. 3 shows a flow diagram for an embodiment of the method according to the invention.

FIG. 3 shows a flow diagram for the method according to an embodiment of the invention. In step 100, at least one measurement run is performed for each axis over the entire work area thereof.

In step 101, data associated with the measurement run are captured and recorded. In step 102, a data processing unit is used to determine a time-frequency representation of recorded data. In step 103, the time-frequency representation or a related representation, e.g. a location-frequency representation, is analyzed by means of an image processing algorithm.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for determining a dynamic response of a machine having at least one axis, the method comprising:
   performing, by a controller of the machine, a measurement run for each axis of the machine over an entire work area of each axis, using a predefined input signal comprising a constant speed overlaid with an excitation signal;
   capturing, using a sensor associated with each axis, output data associated with each measurement run in realtime, the output data comprising a current drawn by a drive of each axis or a speed of the drive;
   recording the output data in a data storage unit;
   determining a time-frequency representation of the output data using a data processing unit;
   converting, using the data processing unit, the time-frequency representation of the recorded data into a location-frequency representation, wherein the location-frequency representation comprises a color or grayscale image as a function of frequency and position of each axis, wherein a color or grayscale intensity of the color or gray scale image represents an amplitude of a frequency response; and
   analyzing the location-frequency representation using an image processing algorithm for extracting natural frequencies, attenuations, or hystereses.

2. The method as claimed in claim 1, wherein the measurement run for each axis is carried out in sections.

3. The method as claimed in claim 1, wherein the measurement run for each axis is performed during machine downtimes.

4. The method as claimed in claim 1, wherein at least some steps of the method are performed on physically distributed systems.

5. The method as claimed in claim 1, wherein multiple measurement runs using different input signals are performed for at least one axis.

6. The method as claimed in claim 1, wherein the machine has at least two axes, and a measurement run is performed for at least one axis while another axis is being moved.

7. The method as claimed in claim 1, wherein the machine has at least two axes, and wherein a first axis is prepositioned in different positions and a measurement run is performed for a second axis at each position of the first axis.

8. The method as claimed in claim 1, wherein the time-frequency representation is determined by a Fourier transformation, quadratic transformation or Wigner-Ville distribution.

9. The method as claimed in claim 1, wherein the location-frequency representation is rated in the image area using image processing algorithms.

10. The method as claimed in claim 1, wherein an artificial neural network is trained by feeding an analysis of the location-frequency representation in the image to the artificial neural network.

11. The method as claimed in claim 10, wherein the artificial neural network is provided with metadata.

12. A system for determining a dynamic response of a machine having multiple axes, the system comprising:
the machine that comprises the multiple axes, the machine comprising a controller for moving the multiple axes;
a data capture unit;
at least one data source connected to the data capture unit, the data capture unit configured to capture output data in realtime provided by the at least one data source during a measurement run for each axis of the multiple axes over an entire work area of each axis, the output data comprising a current drawn by a drive of each axis or a speed of the drive;
a data storage unit for storing the output data captured by the data capture unit;
a data processing unit configured to determine a time-frequency representation of the output data, and convert the time-frequency representation into a location-frequency representation, wherein the location-frequency representation comprises a color or grayscale image as a function of frequency and position of each axis, wherein a color or grayscale intensity of the color or gray scale image represents an amplitude of a frequency response; and
an image processing device for processing the location-frequency representation for extracting natural frequencies, attenuations, or hystereses.

13. The system as claimed in claim 12, wherein the image processing device comprises a neural network.

14. The method as claimed in claim 1, wherein the measurement run for each axis is performed while the machine is operating.

* * * * *